(12) United States Patent
Honda et al.

(10) Patent No.: US 7,946,621 B2
(45) Date of Patent: May 24, 2011

(54) AIRBAG DEVICE FOR VEHICLE

(75) Inventors: Takashi Honda, Utsunomiya (JP);
Yusuke Nishida, Moka (JP)

(73) Assignee: Honda Motor Co., Ltd., Tokyo (JP)

( * ) Notice: Subject to any disclaimer, the term of this patent is extended or adjusted under 35 U.S.C. 154(b) by 613 days.

(21) Appl. No.: 11/708,890

(22) Filed: Feb. 21, 2007

(65) Prior Publication Data

US 2007/0216142 A1 Sep. 20, 2007

(30) Foreign Application Priority Data

Mar. 15, 2006 (JP) ................................. 2006-070988

(51) Int. Cl.
*B60R 21/23* (2006.01)
*B60R 21/233* (2006.01)
(52) U.S. Cl. .................. 280/743.2; 280/730.2; 280/729
(58) Field of Classification Search ............... 280/730.2, 280/743.1, 743.2, 729
See application file for complete search history.

(56) References Cited

U.S. PATENT DOCUMENTS

| 5,464,250 | A | * | 11/1995 | Sato | 280/743.1 |
| 5,647,609 | A | * | 7/1997 | Spencer et al. | 280/730.2 |
| 5,845,935 | A | * | 12/1998 | Enders et al. | 280/743.2 |
| 5,865,465 | A | * | 2/1999 | Bauer et al. | 280/743.1 |
| 5,899,490 | A | * | 5/1999 | Wipasuramonton et al. | 280/730.2 |
| 5,924,722 | A | * | 7/1999 | Koide et al. | 280/730.2 |
| 6,364,348 | B1 | * | 4/2002 | Jang et al. | 280/730.2 |
| 6,422,593 | B1 | * | 7/2002 | Ryan | 280/730.2 |
| 6,478,329 | B1 | * | 11/2002 | Yokoyama | 280/729 |
| 6,991,257 | B2 | * | 1/2006 | Zhao et al. | 280/730.2 |
| 7,125,037 | B2 | * | 10/2006 | Tallerico et al. | 280/728.2 |
| 7,222,877 | B2 | * | 5/2007 | Wipasuramonton et al. | 280/730.1 |
| 7,338,070 | B2 | * | 3/2008 | Madasamy et al. | 280/730.2 |
| 7,350,811 | B2 | * | 4/2008 | Sato | 280/743.2 |
| 7,431,332 | B2 | * | 10/2008 | Wipasuramonton et al. | 280/730.2 |
| 7,461,862 | B2 | * | 12/2008 | Hasebe et al. | 280/743.2 |
| 2001/0045729 | A1 | * | 11/2001 | Mueller | 280/730.2 |
| 2003/0178821 | A1 | * | 9/2003 | Schneider et al. | 280/730.2 |
| 2004/0145161 | A1 | * | 7/2004 | Hasebe et al. | 280/729 |
| 2005/0161927 | A1 | * | 7/2005 | Yokoyama et al. | 280/743.1 |
| 2006/0038386 | A1 | * | 2/2006 | Shibayama et al. | 280/730.2 |
| 2006/0232054 | A1 | * | 10/2006 | Schlosser et al. | 280/743.2 |

FOREIGN PATENT DOCUMENTS

| JP | 2000-108835 | | 4/2000 |
| JP | 2004-189187 | A | 7/2004 |
| JP | 2004-217184 | A | 8/2004 |

* cited by examiner

*Primary Examiner* — Paul N. Dickson
*Assistant Examiner* — George D. Spisich
(74) *Attorney, Agent, or Firm* — Carrier Blackman & Associates, P.C.; Joseph P. Carrier; William D. Blackman

(57) ABSTRACT

An airbag device for a vehicle including an inflator that generates high-pressure gas upon receiving an impact; and an airbag that deploys between an occupant and a vehicle body side portion from a folded state upon receiving the high-pressure gas from the inflator, wherein the airbag has a deployment restriction member that restricts the height of the airbag in the vehicle body vertical direction during deployment.

18 Claims, 3 Drawing Sheets

AIRBAG DEVICE FOR VEHICLE

BACKGROUND OF THE INVENTION

1. Field of the Invention

The present invention relates to an airbag device for a vehicle that protects an occupant with an airbag that deploys by gas pressure upon receiving an impact such as during a vehicle collision.

Priority is claimed on Japanese Patent Application No. 2006-070988, filed Mar. 15, 2006, the content of which is incorporated herein by reference.

2. Description of Related Art

There are known airbag devices for vehicles in which an airbag deploys between an occupant and a vehicle body side portion during a collision.

For example, in the airbag device disclosed in Japanese Unexamined Patent Application, First Publication No. 2000-108835, the airbag is housed in a folded state in the seat back of a front seat. When a sensor detects the input of an impact, the inflator supplies high-pressure gas to the airbag, causing the airbag to inflate between the occupant and the vehicle body side portion.

However, the structure of such a conventional airbag device causes the airbag to largely deploy in the vertical direction of the vehicle body. As a result, it is difficult to secure the expansion dimension of the airbag in the vehicle width direction during deployment, and variations in the vertical height of the airbag easily occur during deployment.

SUMMARY OF THE INVENTION

The present invention has as its object to provide a vehicle airbag device that can achieve securement of sufficient expansion dimension in the vehicle width direction during deployment of the airbag and accurate position control of the airbag in the vehicle body vertical direction.

In order to solve the aforementioned problems, the present invention provides an airbag device for a vehicle including an inflator that generates high-pressure gas upon receiving an impact and an airbag that deploys between an occupant and a vehicle body side portion from a folded state upon receiving the high-pressure gas from the inflator, wherein the airbag is provided with a deployment restriction member that restricts the height of the airbag in the vehicle body vertical direction during deployment.

Thereby, when high-pressure gas is supplied to the airbag upon receiving an impact, the airbag inflates with its height in the vehicle body vertical direction being restricted by the deployment restriction member. At this time, the height of the airbag in the vehicle body vertical direction is restricted. For this reason, it is possible to sufficiently secure the expansion dimension of the airbag in the vehicle width direction by just that much and enable accurate position control of the airbag in the vertical direction during deployment.

The deployment restriction member may be provided inside the airbag and may be constituted by a belt member that extends along the vertical direction of the airbag during deployment of the airbag.

In this way, since the deployment restriction member is constituted by a belt member and extends inside the airbag, the deployment restriction member can be readily attached to the airbag during the manufacturing phase of the airbag. Therefore, it is possible to achieve a reduction in manufacturing costs. Also, the deployment restriction member is belt-shaped and does not impede the flow of gas inside the airbag during deployment. For that reason, the deployment attitude of the airbag can be more favorably controlled.

Moreover, the airbag may be constituted by joining edge portions of base fabrics thereof, and the end portions of the belt member may be fixed at the joining locations of the edge portions of the airbag.

Thereby, the belt member can be attached to the airbag simultaneously with the joining of the edge portions of the airbag. For this reason, it is possible to simplify the manufacture of the airbag device and achieve a reduction in the manufacturing costs.

Furthermore, the airbag may have a middle joining portion that joins left and right side walls of the base fabrics in the vehicle width direction midway between upper and lower joining locations of edge portions of base fabrics of the airbag, and the end portions of the belt member may be fixed to the middle joining portion.

Thereby, when joining the middle joining portion of the base fabrics, the belt member can be simultaneously attached to the airbag. For this reason, it is possible to simplify the manufacture of the airbag device and achieve a reduction in the manufacturing costs.

Furthermore, the belt member may be fixed to the upper joining location of the edge portions and the middle joining portion of the airbag so as to connect both the upper joining location of the edge portions and the middle joining portion of the airbag.

Thereby, the deployment height of the upper region of the airbag in the vehicle body vertical direction is restricted by the belt member. For this reason, position control of the upper region of the airbag and securement of the expansion dimension in the vehicle width direction can be more favorably performed. Accordingly, the load of the upper half of an occupant's body can be more advantageously supported with sufficient absorption allowance even at a position above the door body.

Furthermore, a top end of the belt member may be formed wider than a bottom end thereof.

Thereby, the height of a wide region of the upper edge side of the airbag can be restricted by the belt member without expanding the surface contact at the middle joining portion. For this reason, sufficient securement of the occupant protection region of the deployed airbag and favorable position control of the upper region of the airbag can be simultaneously achieved to a high degree.

DETAILED DESCRIPTION OF THE INVENTION

Embodiments of the airbag device according to the present invention shall be described hereinbelow, with reference to the attached drawings.

First Embodiment

Figure 1:
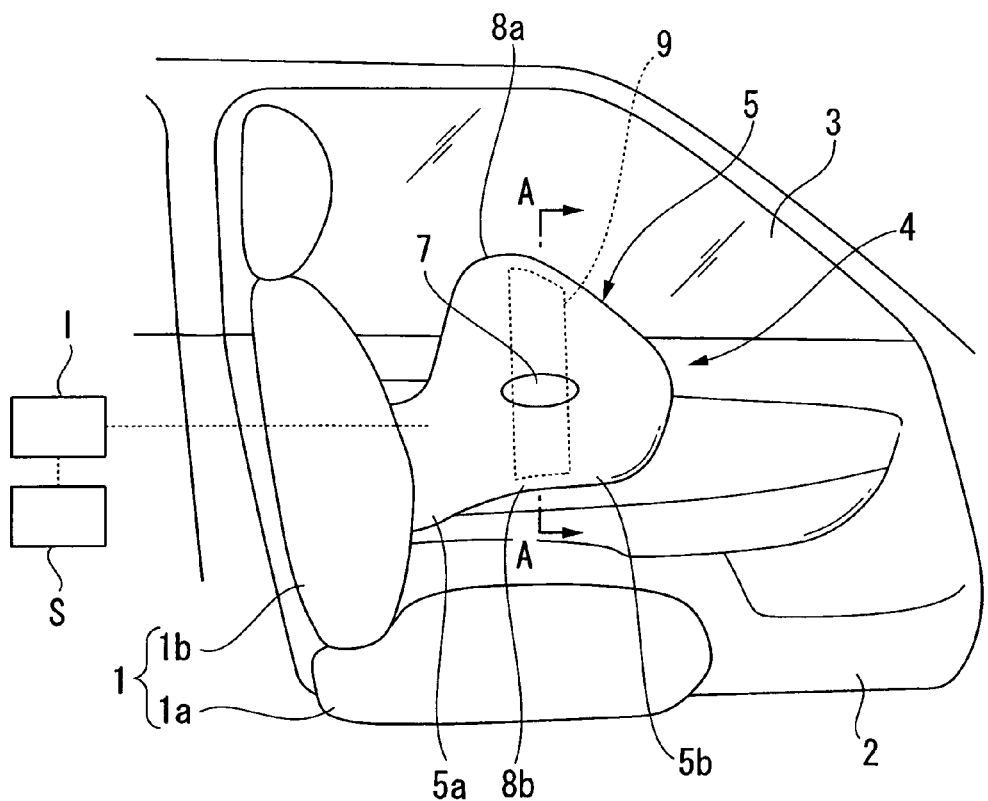
FIG. 1 is a side view showing the airbag device according to a first embodiment of the present invention.
Figure 2:
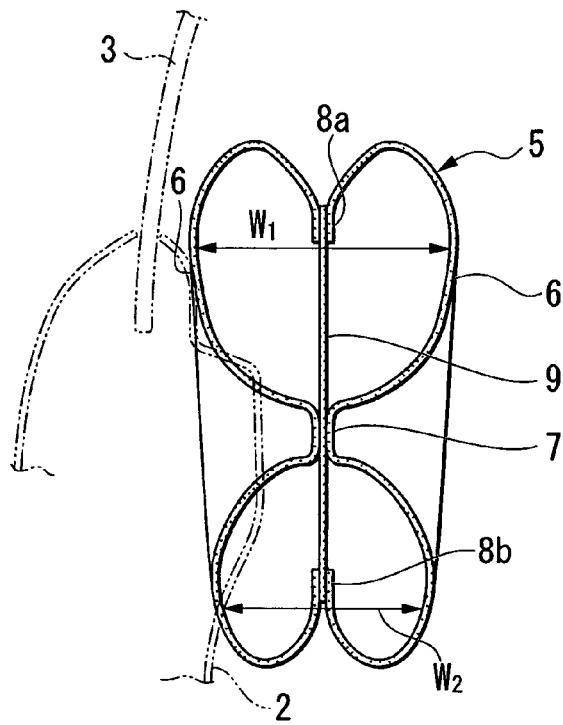
FIG. 2 is a sectional view along line A-A of FIG. 1.

FIGS. 1 and 2 illustrate a first embodiment of the present invention. Symbol 1 in FIG. 1 denotes a front seat of a vehicle, symbol 1*a* denotes a seat cushion on which an occupant sits, symbol 1*b* denotes a seat back that supports the back of the seated occupant, symbol 2 denotes a side door of a vehicle (vehicle body side portion) that is positioned on the side of the seated occupant, and symbol 3 denotes a door glass that is installed in the side door 2. The airbag device 4 (airbag device for a vehicle) according to this invention is housed in the side portion of the seat back 1*b*. FIG. 1 shows the state in which the airbag device 4 has been actuated.

The airbag device 4 is provided with a sensor S that detects an impact such as a collision impact, an inflator I that generates high-pressure gas when the sensor detects an impact, and an airbag 5 that deploys by receiving the high-pressure gas from the inflator. The sensor S and the inflator I may be of types that are known in the art, and so detailed illustrations thereof are omitted in FIG. 1. The airbag 5 is folded into a predetermined shape, and housed on the inner side of the side portion of the seat back 1*b*. During a collision impact, the airbag 5 expands upon receiving the gas pressure of the inflator I, flies out from the side portion of the seat back 1*b*, and deploys between the occupant and the side door 2.

The airbag 5 has a base portion 5*a* that is connected to the inflator I and a main impact absorption portion 5*b* at the distal end side thereof. The base portion 5*a* has a nearly constant height, and the main impact absorption portion 5*b* has a large height with respect to the base portion 5*a*. The airbag 5 is constituted by two base fabrics 6 (refer to FIG. 2), with the outer edge portions thereof being folded back to the inside and stitched together. In approximately the middle position of the side surfaces of the main impact absorption portion 5*b*, a middle joining portion 7 is provided in which the left and right base fabrics 6 are stitched together in an approximately elliptical shape over a predetermined range. The middle joining portion 7 is provided corresponding to the position of the elbow of the occupant seated in the front seat 1.

Also, on the main impact absorption portion 5*b* of the airbag 5, a tether belt 9 (belt member, deployment restriction member) that couples an upper joining location 8*a* and a lower joining location 8*b* of the outer edge portions of the base fabrics 6 is provided. This tether belt 9 is made of a textile that hardly expands or contracts in the lengthwise direction, and is provided inside the airbag 5 so as to extend in the vehicle body vertical direction during deployment of the airbag 5. The top and bottom ends of the tether belt 9 are respectively sandwiched between the right and left base fabrics 6 at the upper joining location 8*a* and the lower joining location 8*b* and stitched to the edges of both base fabrics 6. Also, the center portion of the tether belt 9 in the lengthwise direction is disposed between the base fabrics 6 at the middle joining portion 7 of the airbag 5. During the stitching of this middle joining portion 7, the tether belt 9 is simultaneously stitched to both base fabrics 6.

The tether belt 9 respectively couples the upper joining location 8*a* and the middle joining portion 7, as well as the middle joining portion 7 and the lower joining location 8*b*, and thereby restricts the height of the airbag 5 when deployed. Also, the top and bottom end portions of the tether belt 9 are pulled in the vehicle body vertical direction during deployment of the airbag 5, so that tether belt 9 maintains an attitude of the airbag 5 conforming to the internal gas flow. As shown, the belt is shorter than a vertical dimension between peripheral edges of the airbag when deployed. The width of the airbag 5 in the vehicle body width direction during deployment of the airbag 5 ranges from an upper deployment width $W_1$ to a lower deployment width $W_2$ that straddle the middle joining portion 7. The upper deployment width $W_1$ is set relatively wide with respect to the lower deployment width $W_2$.

Since the height of the airbag 5 in the vehicle body vertical direction during deployment is restricted by the tether belt 9, the airbag device 4 can by just that much sufficiently ensure the expansion dimension of the airbag 5 in the vehicle width direction. Moreover, the vertical position of the airbag 5 during deployment can be accurately controlled. Also, the airbag device 4 can reliably expand the upper deployment width $W_1$ of the airbag 5 with respect to the lower deployment width $W_2$. Therefore, the load of the upper half of an occupant's body can be advantageously supported with sufficient absorption amount even at a position above the door body of the side door 2 (including the door lining of the cabin interior side).

In particular, in the airbag device 4 of the present embodiment, since the top and bottom ends of the tether belt 9 are joined between the stitched portions of the left and right base fabrics 6 of the airbag 5, there are the advantages of the deployment balance of the left and right base fabrics 6 being favorable, and the deployment attitude of the airbag 5 stabilizing.

Since the tether belt 9 can maintain the attitude of the airbag 5 so as to conform to the gas flow therein during deployment, the flow of the gas inside the airbag 5 is in no way impeded. Accordingly, the airbag 5 can be rapidly deployed to the anticipated attitude.

In the case of the airbag device 4, the tether belt 9, which is the deployment restriction member, extends inside the airbag 5 along the vehicle body vertical direction when deployed. Also, the tether belt 9 is simultaneously stitched to the upper joining location 8*a* and the middle joining portion 7, as well as the middle joining portion 7 and the lower joining location 8*b*, which are the stitching portions of the left and right base fabrics 6 of the airbag 5. Therefore, it is possible to simplify the manufacture of the airbag device 4 and achieve a reduction in the manufacturing costs by that much.

Second Embodiment

Figure 3:
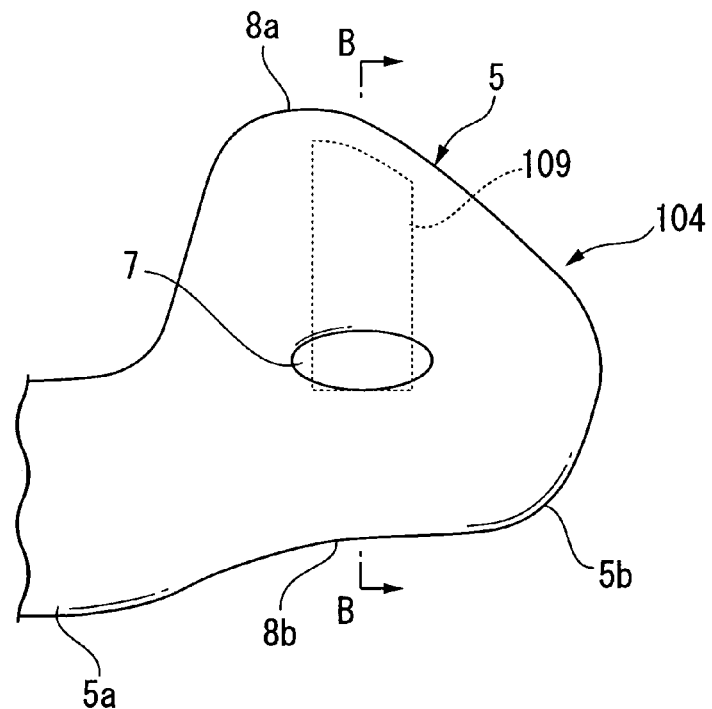
FIG. 3 is a side view showing the airbag in the airbag device according to a second embodiment of the present invention.
Figure 4:
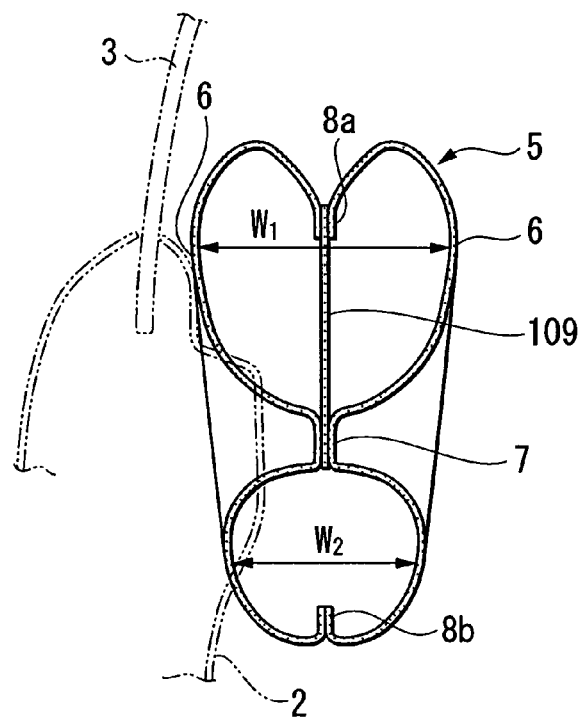
FIG. 4 is a sectional view along line B-B of FIG. 3.

FIGS. 3 and 4 show a second embodiment of the present invention. In the description hereinbelow including the description of a third embodiment that follows, portions similar to those in the first embodiment shall be given the same symbols and redundant descriptions thereof shall be omitted.

The basic constitution of an airbag device 104 of the second embodiment is nearly identical to the airbag device 4 of the first embodiment. However, a tether belt 109 thereof is approximately half the length of that of the first embodiment, with the two ends of the tether belt 109 being respectively fixed to the upper joining location 8*a* and the middle joining portion 7 of the base fabrics 6 that make up the airbag 5. This fixing is performed by the tether belt 109 being interposed between the left and right base fabrics 6 and being simultaneously stitched thereto during the stitching of the left and right base fabrics 6, similarly to the first embodiment. Again, the belt is shorter than a vertical dimension between peripheral edges of the airbag when deployed.

The airbag device 104 can basically obtain the same effect as the first embodiment. However, since only the upper joining location 8*a* and the middle joining portion 7 of the base fabrics 6 that make up the airbag 5 are joined by the tether belt 109, position control in the vertical direction and securement of the expansion dimension in the vehicle width direction can only be performed for the upper region of the airbag 5 during deployment. Accordingly, while restricting a rise in manufacturing costs, it is possible to secure a sufficient upper deployment width $W_1$ of the airbag 5 and more advantageously support the load of the upper half of an occupant's body.

Third Embodiment

Figure 5:
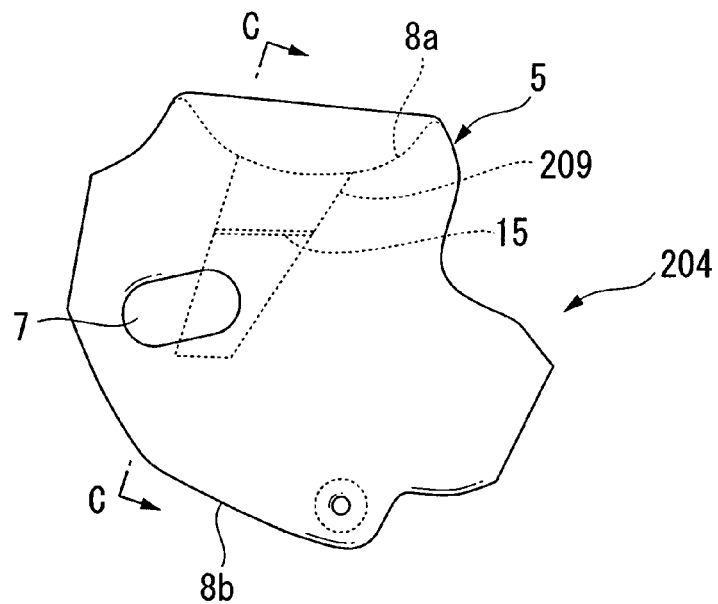
FIG. 5 is a side view showing the airbag in the airbag device according to a third embodiment of the present invention.
Figure 6:
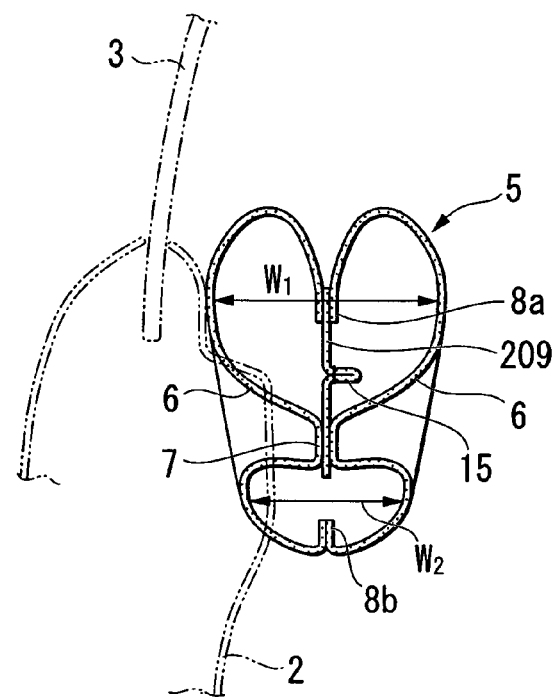
FIG. 6 is a sectional view along line C-C of FIG. 5.

FIGS. 5 and 6 show a third embodiment of the present invention.

The basic constitution of an airbag device 204 of the third embodiment is nearly identical to that of the second embodiment. There are two points of difference, namely, a tether belt 209 is formed to become wider from the lower end to the upper end thereof, and a set length of the tether belt 209 is gathered at the middle portion thereof in the lengthwise direction and stitched (hereinbelow, this portion is referred to as the "gathered portion 15"). Again, the belt is shorter than a vertical dimension between peripheral edges of the airbag when deployed.

The airbag device 204 can basically obtain the same effect as the second embodiment. However, since the tether belt 209 is formed to become wider from the lower end to the upper end thereof, it is possible to restrain a wider region of the upper joining location 8a of the airbag 5 without increasing beyond necessity the middle joining portion 7 at which the lower end of the tether belt 209 is fixed. Therefore, even in the case of providing the gathered portion 15 in a portion of the lengthwise direction of the tether belt 209 to shorten the length of the tether belt 209, during deployment of the airbag 5, a wide region of the upper joining location 8a of the airbag 5 can be uniformly pulled and the position of the airbag 5 in the vehicle body vertical position can be more favorably controlled.

Accordingly, in the case of adopting this airbag device 204, it is possible to restrict the height of the upper joining location 8a of the airbag 5 while maintaining the middle joining portion 7 at an optimal size. Accordingly, it is possible to achieve sufficient securement of the occupant protection region of the airbag 5 and suitable position control of the upper portion of the airbag 5.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. For example, in the embodiments described above, the middle joining portion 7 was formed by stitching the middle portions of the left and right base fabrics 6 of the airbag 5 in an overlapping manner. However, the middle joining portion 7 may be formed by joining the left and right base fabrics 6 with a separate member. In this case, the tether belt 9, 109, and 209 may be stitched to the base fabrics 6 with the separate member. Accordingly, the invention is not to be considered as being limited by the foregoing description, and is only limited by the scope of the appended claims.

What is claimed is:

1. An airbag device for a vehicle, said airbag device comprising:
    an inflator that generates high-pressure gas upon receiving an impact; and
    an airbag that is configured and arranged to deploy in an area of the vehicle between an occupant and a vehicle body side portion from a folded state upon receiving the high-pressure gas from the inflator,
    wherein:
        the airbag is provided with a deployment restriction member that restricts a height of the airbag in a vehicle body vertical direction during deployment,
        the deployment restriction member is provided inside the airbag and comprises a belt member which extends in the vehicle vertical direction during deployment of the airbag,
        the belt member is joined to the airbag at at least two portions that are spaced apart from each other,
        the deployment restriction member is shorter than a vertical dimension between peripheral edges of the airbag when deployed,
        the airbag comprises first and second base fabrics which are interconnected by joining edge portions thereof, an upper end portion of the belt member is fixed at a joining location of the edge portions at an upper part of the airbag, and at least one additional portion of the belt member spaced from the upper end portion is fixed to the first and second base fabrics at portions of the base fabrics spaced from the upper part of the airbag such that the height of the airbag in the vehicle body vertical direction is restricted between the fixed portions of the belt member, and
        the airbag has a middle joining portion that joins left and right side walls of the base fabrics in a vehicle width direction in an area of the airbag located midway between upper and lower joining locations of edge portions of the base fabrics of the airbag, and said at least one additional portion of the belt member spaced from the upper end portion of the belt member is fixed to the middle joining portion.

2. The airbag device for a vehicle according to claim 1, wherein the belt member is fixed to the joining location of the edge portions at the upper part of the airbag and to the middle joining portion of the airbag so as to connect both the upper joining location of the edge portions and the middle joining portion of the airbag.

3. The airbag device of claim 1, wherein an upper deployment width of the airbag in the vehicle body width direction at an upper portion thereof, which protects an upper body portion of an occupant when deployed, is greater than a lower deployment width of the airbag in the vehicle width direction at a lower portion thereof.

4. The airbag device of claim 1, wherein an upper deployment width of the airbag in the vehicle body width direction at an upper portion thereof, which protects an upper body portion of an occupant when deployed, is greater than a lower deployment width of the airbag in the vehicle width direction at a lower portion thereof.

5. The airbag device of claim 1, wherein the belt member is formed as a length of textile material which extends in the vertical direction of the airbag and in a vehicle longitudinal direction, and is substantially non-expandable in the vertical direction of the airbag during deployment thereof, and opposite side portions of the airbag respectively expand in vehicle width directions away from corresponding opposite surfaces of the belt member.

6. The airbag device of claim 5, wherein the belt member is disposed centrally of the airbag in a vehicle width direction.

7. The airbag device of claim 1, wherein the belt member is disposed centrally of the airbag in a vehicle width direction.

8. The airbag device of claim 1, wherein the left and right base fabrics are stitched together in a substantially elliptical shape to form the middle joining portion.

9. The airbag device of claim 1, wherein the airbag is configured to be disposed in a seat back of a vehicle seat.

10. The airbag device for a vehicle according to claim 1, wherein the belt member is a planar member when the airbag is deployed.

11. The airbag device for a vehicle according to claim 1, wherein the deployment restriction member restrains deployment of the airbag in an upward direction.

12. An airbag device for a vehicle, said airbag device comprising:
an inflator that generates high-pressure gas upon receiving an impact; and
an airbag that is configured and arranged to deploy in an area of the vehicle between an occupant and a vehicle body side portion from a folded state upon receiving the high-pressure gas from the inflator,
wherein:
the airbag is provided with a deployment restriction member that restricts a height of the airbag in a vehicle body vertical direction during deployment,
the deployment restriction member is provided inside the airbag and comprises a belt member which extends in the vehicle vertical direction during deployment of the airbag,
the belt member is joined to the airbag at at least two portions that are spaced apart from each other,
the deployment restriction member is shorter than a vertical dimension between peripheral edges of the airbag when deployed, and
the airbag comprises first and second base fabrics which are interconnected by joining edge portions thereof, upper and lower end portions of the belt member are fixed at joining locations of the edge portions at upper and lower parts of the airbag, respectively, the airbag has a middle joining portion that joins left and right side walls of the base fabrics in a vehicle width direction in an area of the airbag located midway between upper and lower joining locations of edge portions of the base fabrics of the airbag, and an intermediate portion of the belt member spaced from the upper and lower end portions thereof is fixed to the middle joining portion such that the height of the airbag in the vehicle body vertical direction is restricted between the fixed portions of the belt member.

13. An airbag device for a vehicle, said airbag device comprising:
an inflator that is adapted to generate high-pressure gas upon receiving an impact; and
an airbag that is configured and arranged to deploy from a folded state in an area of the vehicle between an occupant and a vehicle body side portion upon receiving the high-pressure gas from the inflator, said airbag comprising first and second base fabrics which are attached to one another at edge portions thereof to define an edge seam, and having a middle joining portion that joins portions of the first and second base fabrics together in an area of the airbag located between upper and lower joining locations of the edge portions of the base fabrics;
wherein the airbag is provided with a belt member which restricts a height of the airbag in a vehicle body vertical direction during deployment thereof, an upper end of the belt member is attached to the first and second base fabrics at an upper joining location proximate a top portion of the airbag, said belt member extending substantially vertically downwardly from the upper joining portion, wherein a portion of the belt member spaced away from the upper end is disposed between and attached to the first and second base fabrics at the middle joining portion, so as to connect both the upper joining location of the edge portions and the middle joining portion of the airbag, and wherein the deployment restriction member is shorter than a vertical dimension between peripheral edges of the airbag when deployed.

14. The airbag device of claim 13, wherein an upper deployment width of the airbag at a portion thereof above the middle joining portion, when deployed, is greater than a lower deployment width of the airbag at a portion thereof below the middle joining portion.

15. The airbag device of claim 13, wherein the left and right base fabrics are stitched together in a substantially elliptical shape to form the middle joining portion.

16. The airbag device of claim 13, wherein the belt member is formed as a length of textile material which extends in the vertical direction of the airbag and in a vehicle longitudinal direction, and is substantially non-expandable in the vertical direction of the airbag during deployment thereof, and opposite side portions of the airbag respectively expand in vehicle width directions away from corresponding opposite surfaces of the belt member.

17. The airbag device of claim 13, wherein the belt member is disposed centrally of the airbag in a vehicle width direction.

18. The airbag device of claim 13, wherein a lower end of the belt member is attached to the first and second base fabrics at a lower joining location proximate a bottom portion of the airbag such that the belt member connects the upper and lower joining locations of the edge portions and the middle joining portion of the airbag.

* * * * *